United States Patent
Andreas-Schott

(10) Patent No.: US 10,804,545 B2
(45) Date of Patent: Oct. 13, 2020

(54) FUEL CELL

(71) Applicant: Volkswagen AG, Wolfsburg (DE)

(72) Inventor: Benno Andreas-Schott, Sassenburg/OT Triangel (DE)

(73) Assignee: Audi AG, Ingolstadt (DE)

( * ) Notice: Subject to any disclaimer, the term of this patent is extended or adjusted under 35 U.S.C. 154(b) by 542 days.

(21) Appl. No.: 15/126,207

(22) PCT Filed: Dec. 18, 2014

(86) PCT No.: PCT/EP2014/078539
§ 371 (c)(1),
(2) Date: Sep. 14, 2016

(87) PCT Pub. No.: WO2015/139793
PCT Pub. Date: Sep. 24, 2015

(65) Prior Publication Data
US 2017/0098836 A1    Apr. 6, 2017

(30) Foreign Application Priority Data
Mar. 19, 2014   (DE) .................... 10 2014 205 081

(51) Int. Cl.
| | |
|---|---|
| *H01M 8/0271* | (2016.01) |
| *H01M 8/0265* | (2016.01) |
| *H01M 8/2483* | (2016.01) |
| *H01M 8/0297* | (2016.01) |
| *H01M 8/0258* | (2016.01) |
| *H01M 8/1018* | (2016.01) |

(52) U.S. Cl.
CPC ....... *H01M 8/0271* (2013.01); *H01M 8/0258* (2013.01); *H01M 8/0265* (2013.01); *H01M 8/0297* (2013.01); *H01M 8/2483* (2016.02); *H01M 2008/1095* (2013.01); *H01M 2250/20* (2013.01); *Y02T 90/32* (2013.01)

(58) Field of Classification Search
CPC ............. H01M 8/0271; H01M 8/0258; H01M 8/0297; H01M 8/2483
See application file for complete search history.

(56) References Cited

U.S. PATENT DOCUMENTS

| | | | |
|---|---|---|---|
| 7,291,414 B2 | 11/2007 | Goebel et al. | |
| 8,372,556 B2 | 2/2013 | Goebel | |

(Continued)

FOREIGN PATENT DOCUMENTS

| | | |
|---|---|---|
| CN | 101587964 | 11/2009 |
| CN | 102142566 | 8/2011 |

(Continued)

*Primary Examiner* — Jonathan G Jelsma
(74) *Attorney, Agent, or Firm* — Davidson, Davidson & Kappel, LLC

(57) ABSTRACT

A fuel cell (10) including at least one membrane assembly (13) arranged between at least two polar plates (14) of the fuel cell (10) is provided. The fuel cell (10) has at least one pair (25) of flow regions situated outside an active region (16) of the membrane assembly (13), the pair having overlapping flow regions (20) on both sides of the membrane assembly (13). A support (18) for supporting the membrane assembly (13) is arranged in one of the overlapping flow regions (20) on one side of the membrane assembly (13), between the membrane assembly (13) and one of the polar plates (14).

18 Claims, 2 Drawing Sheets

(56) References Cited

U.S. PATENT DOCUMENTS

| | | | | |
|---|---|---|---|---|
| 2004/0219410 A1* | 11/2004 | Tanaka | ............... | H01M 8/0258 |
| | | | | 429/434 |
| 2007/0082252 A1 | 4/2007 | Goebel et al. | | |
| 2009/0325036 A1 | 12/2009 | Blank et al. | | |
| 2011/0195332 A1* | 8/2011 | Goebel | .............. | H01M 8/0232 |
| | | | | 429/465 |

FOREIGN PATENT DOCUMENTS

| | | |
|---|---|---|
| CN | 203205485 | 9/2013 |
| DE | 10257964 | 7/2004 |
| DE | 102005057045 A1 | 6/2007 |
| DE | 112005003103 | 10/2007 |
| DE | 102011009805 | 8/2011 |

* cited by examiner

FUEL CELL

The present invention relates to a fuel cell including at least one membrane system which is situated between at least two polar plates of the fuel cell. Outside an active area of the membrane system, the fuel cell includes at least one flow area pair which includes overlapping flow areas situated on either side of the membrane system.

BACKGROUND

Fuel cells utilize the chemical reaction of a fuel with oxygen yielding water in order to generate electrical energy. For this purpose, fuel cells include the so-called membrane electrode assembly (MEA) as a core component, which is a combination of a proton-conducting membrane and a respective electrode situated on either side of the membrane (anode and cathode). In addition, gas diffusion layers (GDL) may be situated on either side of the membrane electrode assembly on the sides of the electrodes facing away from the membrane. In general, the fuel cell is formed by a plurality of MEAs arranged in a stack, whose electric power outputs are added up. During operation of the fuel cell, the fuel, in particular hydrogen ($H_2$), or a hydrogen-containing gas mixture, is supplied to the anode, where an electrochemical oxidation from $H_2$ to $H^+$ takes place, giving off electrons. A (waterbound or anhydrous) transport of the protons $H^+$ from the anode space to the cathode space takes place via the electrolyte or the membrane which separates the reaction chambers from each other in a gas-tight manner and electrically isolates them. The electrons provided at the anode are fed to the cathode via an electrical line. The cathode is supplied with oxygen, or an oxygen-containing gas mixture, so that a reduction from $O_2$ to $O^{2-}$ takes place, taking up the electrons. At the same time, these oxygen anions react in the cathode space with the protons transported via the membrane, forming water. Due to the direct conversion of chemical into electrical energy, fuel cells achieve an improved efficiency compared to other electricity generators by circumventing the Carnot factor.

The most advanced fuel cell technology at present is based on polymer electrolyte membranes (PEM), in which the membrane itself is made up of a polymer electrolyte. Acid-modified polymers, in particular perfluorinated polymers, are frequently used for this purpose. The most widely common representative of this class of polymer electrolytes is a membrane made of a sulfonated polytetrafluoroethylene copolymer (trade name: Nafion; copolymer of tetrafluoroethylene and a sulfonyl acid fluoride derivative of a perfluoroalkyl vinyl ether). The electrolytic conduction takes place via hydrated protons, which is why the presence of water is a requirement for the proton conductivity, and it is necessary to moisten the operating gases during operation of the PEM fuel cell. Due to the need for water, the maximum operating temperature of these fuel cells is limited to below 100° C. at normal pressure. Distinguishing it from high-temperature polymer electrolytic membrane fuel cells (HT PEM fuel cells), whose electrolyte conductivity is based on an electrolyte bound to a polymer backbone of the polymer electrolyte membrane with the aid of an electrostatic coordinative bond (for example, phosphoric acid-doped polybenzimidazole (PBI) membrane) and which are operated at temperatures of 160° C., this fuel cell type is also referred to as a low-temperature polymer electrolyte membrane fuel cell (NT PEM fuel cell).

DE 10 2005 057 045 A1, for example, describes a fuel cell unit including bipolar plates which include a distribution area and a collection area between fluid port areas and a flow field. A membrane electrode assembly is clamped between raised support points of the distribution and collection areas. Outside the flow field (outside an active area of the membrane electrode assembly), the distribution and collection areas enable a preferably even supply and discharge of the reactants.

Other known distribution and collection areas include structures having, e.g., trough-shaped recesses. A barrier layer (often also referred to as an edge reinforcement) enclosing the membrane of the membrane electrode assembly may have deformations in the area of a distribution or collection structure after operation of the fuel cell. This results in a reduction of flow-through cross sections within the distribution or collection structure, and thus in an uneven distribution of the reactants in the flow field.

SUMMARY OF THE INVENTION

It is an object of the present invention to provide a fuel cell system which is characterized by increased durability.

According to the present invention, a fuel cell including at least one membrane system, which is situated between at least two polar plates of the fuel cell, is provided. Outside an active area of the membrane system, the fuel cell includes at least one flow area pair which includes overlapping flow areas situated on either side of the membrane system. As a characterizing feature, it is provided that a support, which is designed to support the membrane system, is situated in one of the overlapping flow areas, on one side of the membrane system, between the membrane system and one of the polar plates.

The support reduces or prevents a deformation of the membrane system. By the support being situated only on one side of the membrane system, a possible flow impairment by the support occurs (if at all) only in one of the two flow areas of the flow area pair.

As a result of the spatial expansion of the support, it is thus possible for a free cross section of the flow area in which the support is situated to be reduced, at a constant thickness of an individual cell of the fuel cell. This reduction of the free cross section is preferably divided between both opposing flow areas of the flow area pair. This may be achieved by an appropriate dimensioning of the polar plate. The polar plate preferably includes channels whose base drops (forms a step) at a transition from the active area into the flow area including the support. In the opposing flow area in which thus no support is present, the base of the channels rises at the transition from the active area to the flow area. This embodiment divides a reduction of a flow-through cross section due to the support (which may protrude into the channels) among both opposing flow areas, whereby more even flow conditions are achieved in the two flow areas.

The polar plates are often also referred to as separator plates and may in particular be designed as bipolar plates, which are provided on either side to supply membrane system with reactants. As an alternative, the polar plates may also be designed as monopolar plates, which are provided on one side to supply a membrane system with a reactant. Bipolar plates usually include a center plane which, if the bipolar plate (as is known) is formed of two sheet metals, is a separating plane between these two sheet metals. If a reduction of a flow-through cross section due to the support is divided between both opposing flow areas (see above), this separating plane is not a continuous plane, but a surface area which has an offset at the transition from the active area toward the overlapping flow areas. The offset runs in the direction of that flow area which does not include a support.

The support is in particular designed in such a way that the membrane system rests on the polar plate via the support. The support in particular has a planar shape, whereby a contact pressure of the polar plate on the membrane system is distributed across a larger surface area than would be the case without the support.

If the fuel cell according to the present invention includes more than one membrane system, the fuel cell may also be referred to as a fuel cell stack. Typically, individual cells of the fuel cell stack, which each include one of the membrane systems, are electrically connected in series.

During operation of the fuel cell, the flow areas are in particular supplied with reactants in such a way that a lower pressure prevails in the flow area in which the support is situated than in the opposing flow area of the flow area pair. In this way, the membrane system is pressed against the support. When the support is situated on the side having the higher pressure, it is advantageous to mechanically connect, e.g., to bond, the support to the membrane system in order to prevent the membrane system from detaching from the support.

The two flow areas of the flow area pair overlap in an in particular rectangular top view onto the membrane system, the two flow areas being imagined projected onto a center plane of the membrane system.

The (chemically) active area of the membrane system is that area in which the fuel cell reaction takes place during operation of the fuel cell. For this purpose, the membrane system may preferably include electrodes on either side in its active area, which may include a catalytic coating. In this case, a compact unit composed of the membrane and the electrodes is formed, which often is also referred to as a membrane electrode system or a membrane electrode assembly.

Within the context of the present invention, on either side of the membrane system means on both (opposing) flat sides (main sides) of the membrane system. On one side of the membrane system thus means only on one of the two flat sides of the membrane system. In the particular flow area pair, the support is thus situated only on one of the two flat sides, while no support is present on the other flat side in the particular flow area pair. As a result of the support being present only on one side, the support is only present where it is necessary, whereby an unnecessary increase in the thickness of the fuel cell or of a flow loss in the flow areas is prevented. Such an unnecessary increase in the thickness of the fuel cell or of a flow loss would then exist, e.g., if the support were provided in both flow areas of the particular flow area pair.

Preferably, it is provided that at least one of the overlapping flow areas of the flow area pair is a collection area for collecting a reactant and/or a reaction product discharged from the active area, and the support is situated in the collection area. These embodiments prevent an uncontrolled reduction of a free flow-through cross section in the collection area due to a deformation of the membrane system. The constant cross sections, which do not shrink during operation, reduce, and in particular prevent, an uneven distribution of reactants from increasing over the operating time. As an alternative, the at least one of the overlapping flow areas of the flow area pair may also be a distribution area for distributing a reactant to the active area, the support then being situated in the distribution area instead of in the collection area.

According to the above embodiment, it is preferably provided that the flow area of the flow area pair overlapping with the collection area is a distribution area for distributing a reactant to the active area. The distribution area on the one side of the membrane system and the overlapping collection area on the other side of the membrane system are in general accompanied by a significant pressure difference. The support in the collection area counteracts a deformation of the membrane system as a result of this pressure difference.

According to one preferred embodiment of the present invention, it is provided that the fuel cell includes at least two flow area pairs, the distribution area of a first flow area pair and the collection area of a second flow area pair being situated on the same side of the membrane system. From this results that the distribution area of the second flow area pair and the collection area of the first flow area pair share the other side of the membrane system. A flow through the fuel cell thus occurs according to the counter-flow principle, which means that the two reactants flowing on opposing sides of the membrane system flow in opposite directions. The present invention is advantageous especially in the case of such fuel cells since a collection area, having typically a relatively low pressure, overlaps in each case with a distribution area, having typically a relatively high pressure. An alternative definition would be that each of the two sides of the membrane system includes a distribution area, opposite which a respective collection area is situated on the other side. On both sides, the supports are situated only in the collection area.

When a possible cross section reduction due to the support is divided among both opposing flow areas, the distribution area of the anode side and the collection area of the anode side and/or the distribution area of the cathode side and the collection area of the cathode side within the fuel cell may have identically sized flow-through cross sections. Furthermore, the two opposing flow areas may also have identically sized flow-through cross sections.

Preferably, it is provided that at least one of the overlapping flow areas of the flow area pair has at least one passage of the polar plate which is fluidically connected to the active area, and the support is situated on the side of the membrane system which faces away from the at least one passage. Passages may in particular be supply openings, through which reactants flow out of the bipolar plate at a relatively high speed. The support on the side of the membrane system which is situated opposite the passage prevents a deformation of the membrane system by the outflowing reactant.

Preferably, it is provided that the support covers at least two elevations of the polar plate. The membrane system is thus not only pressed at the at least two elevations of the polar plate, but the load of the pressing process is distributed across a larger surface area with the aid of the support. Between the elevations, the polar plate includes recesses which serve as channels for the reactants during operation of the fuel cell.

The support preferably includes a material of a gas diffusion layer of the fuel cell. The support may furthermore also be formed of the material of the gas diffusion layer, i.e., be made up of the same. The support being made from a material which is pervious to reactants reduces or prevents a possible increase in a flow resistance by the reactants. Further preferably, the support may alternatively also be designed as a metal sheet, which in particular has a thickness of no more than 0.1 mm, preferably of no more than 0.05 mm.

Preferably, it is provided that the support is designed in one piece with one of the gas diffusion layers of the fuel cell.

In addition to the above-mentioned advantages of the material of the gas diffusion layer as the material for the support, in this way also a particularly cost-effective fuel cell is achieved since the gas diffusion layer only has to be designed in an extended manner in the particular flow area to implement the support.

Preferably, it is provided that the membrane system includes at least one barrier layer, at least in the area of the overlapping flow areas, which in particular peripherally encloses the active area (of the membrane system). Such a barrier layer is often also referred to as an edge reinforcement, in particular as an edge reinforcement sheet, since it may overlap an edge of a membrane of the membrane system, and encloses a portion of the membrane situated in the active area.

Furthermore, a motor vehicle including a fuel cell according to the present invention is provided. The fuel cell is typically configured to supply an electric drive of the motor vehicle with energy. The motor vehicle is characterized by increased durability and a constant performance capability.

As an alternative, the fuel cell according to the present invention may also be part of a stationary device, for example a stationary power generation device, which is also characterized by increased durability and a constant performance capability.

The various specific embodiments of the present invention described in the present application may advantageously be combined with each other, unless they are designed differently in the individual case.

BRIEF DESCRIPTION OF THE DRAWINGS

The present invention is described hereafter in exemplary embodiments based on the accompanying drawings.

DETAILED DESCRIPTION

Figure 1:
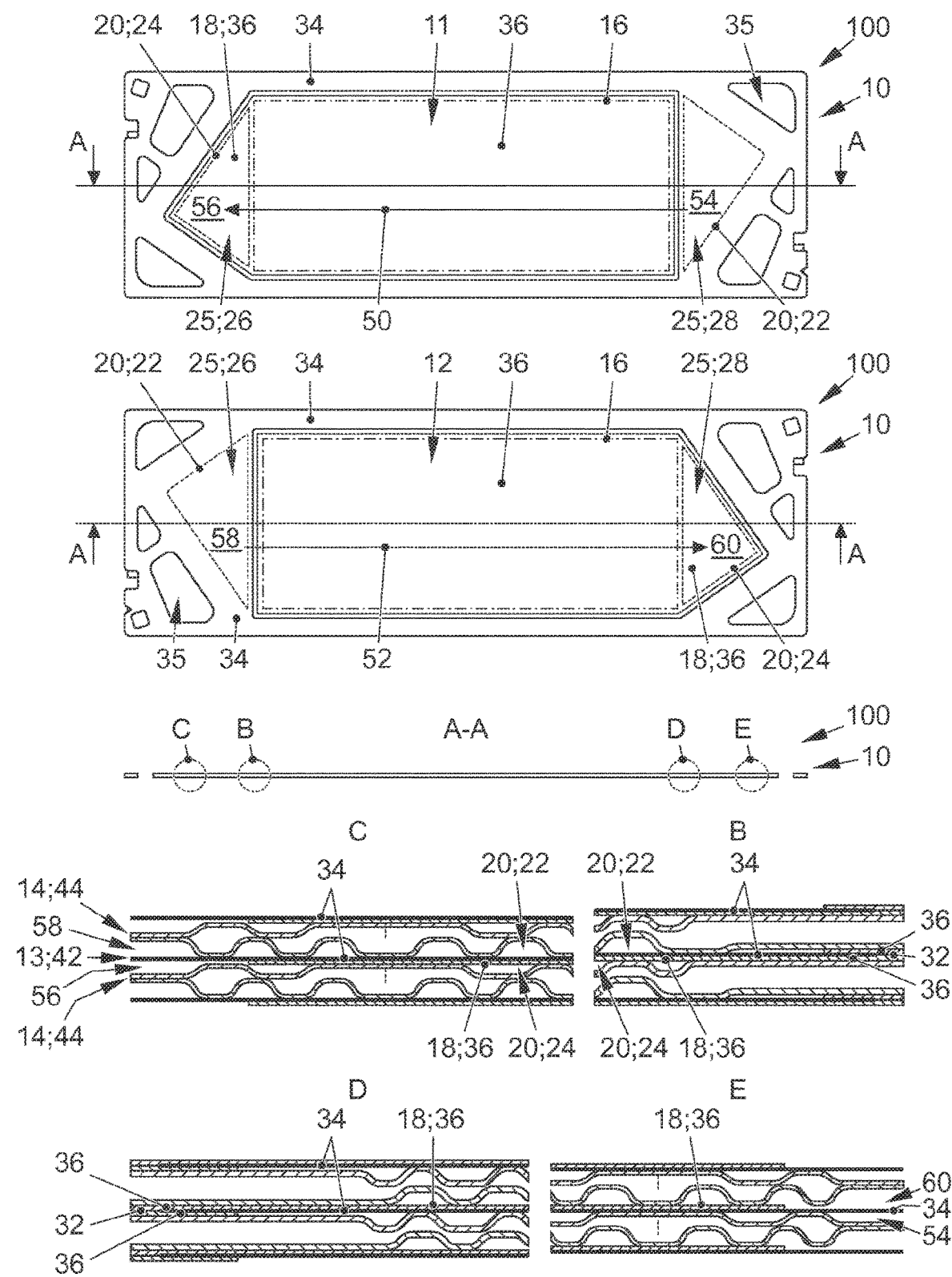
FIG. 1 shows a fuel cell according to one preferred embodiment of the present invention.

FIG. 1 shows a fuel cell 10 according to one preferred embodiment of the present invention. Only a subarea of fuel cell 10 and of a motor vehicle 100 including fuel cell 10 is shown. The upper portion of FIG. 1 shows a top view onto an anode side 11 of fuel cell 10, followed by a top view onto a cathode side 12 of fuel cell 10. Subsequently, a section A-A through the subarea of fuel cell 10 is shown. From section A-A, details C, B, D and E (beneath each other, not true to scale) are shown in an enlarged manner.

Fuel cell 10 includes at least one membrane system 13, which is situated between at least two polar plates 14 of fuel cell 10. In the illustrated example, polar plates 14 are bipolar plates, the fuel cell including multiple polar plates 14 and multiple membrane systems 13. Membrane systems 13 are each situated between two polar plates 14, this being the case only for the middle membrane system 13 in FIG. 1. Outside an active area 16 of membrane system 13, fuel cell 10 includes at least one flow area pair 25, which includes overlapping flow areas 20 situated on either side of membrane system 13. A support 18 is situated in one of overlapping flow areas 20 on one side of membrane system 13 between membrane system 13 and one of polar plates 14. Support 18 is designed to support membrane system 13. Support 18 supports membrane system 13 on an adjoining polar plate 14.

One of overlapping flow areas 20 of a first flow area pair 26 of each membrane system 13 is a distribution area 22 for distributing a reactant (in this case a cathode gas 52) to active area 16. The second of overlapping flow areas 20 is a collection area 24 for collecting a reactant discharged from active area 16 (in this case an anode gas 50). Support 18 is situated in collection area 24.

In a second flow area pair 28 of each membrane system 13 as well, one of overlapping flow areas 20 is a distribution area 22 for distributing a reactant (in this case an anode gas 50) to active area 16, while the second of overlapping flow areas 20 is a collection area 24 for collecting a reactant (in this case a cathode gas 52) or a reaction product (e.g., water) discharged from active area 16. Support 18 is also situated in collection area 24 in second flow area pair 28, and compared to first flow area pair 26 is thus situated on the opposite side of membrane system 13.

Passages through the surface of polar plates 14 may be situated on the opposite side of membrane systems 13 in the area of supports 18. Passages 30 are fluidically connected to active area 16.

In addition to membrane 32, which may essentially be limited to active area 16, membrane system 13 includes a barrier layer 34, which peripherally encloses membrane 32. Since barrier layer 34 generally overlaps an edge of membrane 32 and stabilizes membrane 32, barrier layer 34 is often also referred to as an edge reinforcement or an edge reinforcement sheet. Barrier layer 34 may also overlap membrane 32 on its entire surface area. Typically, barrier layer 34 is a plastic sheet.

Membrane system 13 furthermore includes operating media openings 35 outside active area 16 and outside flow areas 20, which conduct operating media (anode gas, cathode gas and coolant) through fuel cell 10 during operation of fuel cell 10.

Gas diffusion layers 36 are situated between membrane systems 13 and polar plates 14. These extend across active area 16, but according to one preferred embodiment also form supports 18. In this way, supports 18 may be implemented particularly easily by simply extending gas diffusion layers 36 into those flow areas 20, which in the example are collection areas 24, in which supports 18 are to be situated.

Figure 2:
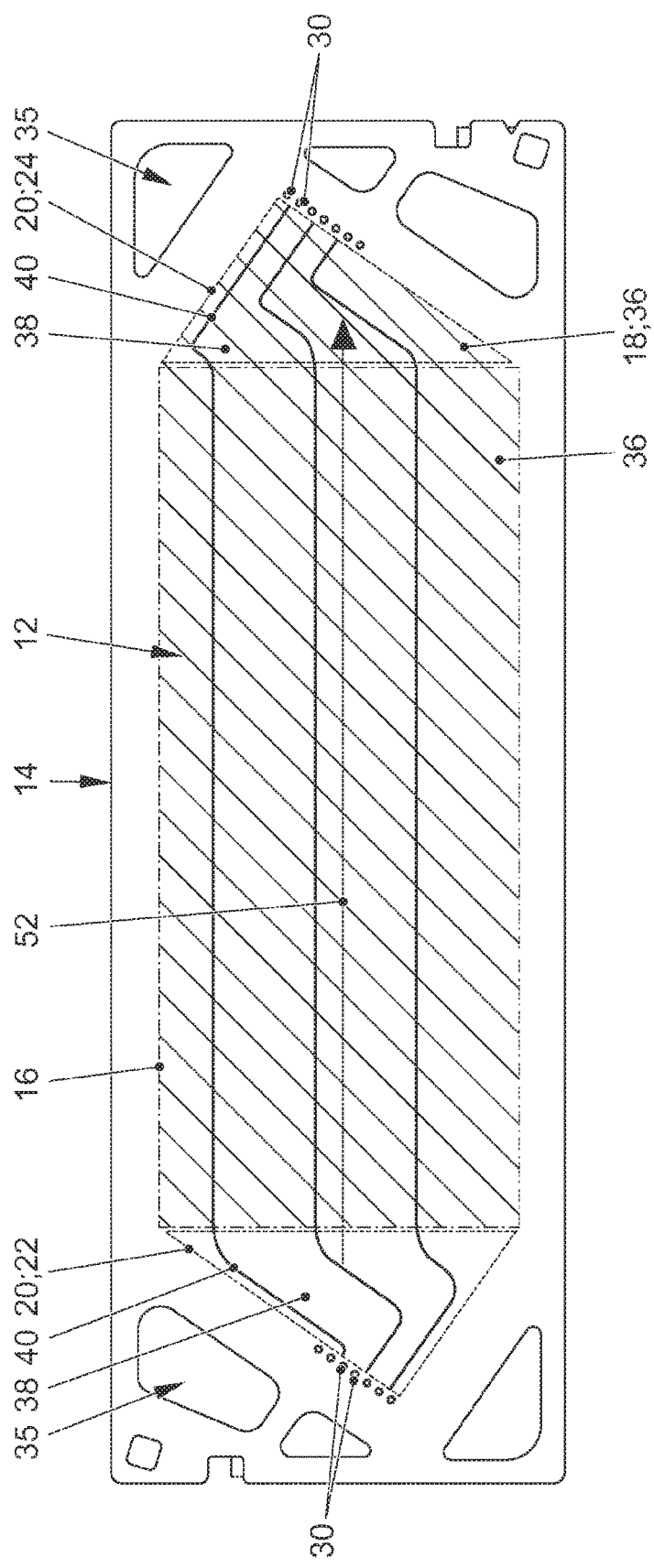
FIG. 2 shows a bipolar plate according to one preferred embodiment of the present invention.

FIG. 2 shows cathode side 12 of one of polar plates 14. Cathode side 12 of polar plate 14 within fuel cell 10 points toward cathode side 12 of membrane system 13. As a result of the planar design of support 18, support 18 covers elevations 38 of polar plate 14. The position and progression of elevations 38 are schematically illustrated in FIG. 2 between also schematically illustrated superficial channels 40 of polar plate 14. Elevations 38 and channels 40 in collection area 24 form a collection structure, while elevations 38 and channels 40 in distribution area 22 form a distribution structure. Channels 40 each have a (channel) base, which at a transition from active area 16 drops into flow area 20 including support 18. The base of channels 40 thus has a depression at the transition from active area 16 to collection area 24.

Gas diffusion layer 36 covers active area 16 and collection area 24, whereby support 18 is formed by gas diffusion layer 36. Gas diffusion layer 36 partially protrudes into channels 40. A cross section reduction of channels 40 by gas diffusion layer 36 is thus divided among both sides of polar plate 14 by the depression of the base.

Furthermore, passages 30 are apparent on the side of distribution area 22, in whose area on the opposite side of adjoining membrane system 13 a support 18 may also be situated. For example, support 18 may extend into this area.

Anode sides 11 and cathode sides 12 shown in the two FIGS. 1 and 2 may be reversed according to one alternative embodiment. Shown anode side 11 may thus be the cathode side. Cathode 12 shown in the figures is then consequently the anode side. In FIG. 2, the view would thus be directed at the anode side, so that anode gas 50 flows through passages 30.

The hatching in FIG. 2 schematically indicates the extension of gas diffusion layer 36. In practice, supports 18 may be assigned either to membrane system 13 or polar plates 14, whereby easy to handle modules result when fuel cell 10 is assembled.

Such a membrane system module 42 thus includes also at least one support 18, in the exemplary embodiment thus two supports 18 and thus also two gas diffusion layers 36, in addition to the membrane system.

As an alternative, a module may also be formed with the aid of polar plates 14, for example one bipolar plate module 44 including at least one support 18, in addition to a bipolar plate. In the exemplary embodiment, bipolar plate module 44 thus includes two supports 18 and thus both gas diffusion layers 36. During operation of fuel cell 10, an anode gas 50 flows into distribution areas 22 through inlet-side passages 30 on anode sides 11 of membrane systems 13 and polar plates 14. In each membrane system 13, anode gas 50 consecutively flows through distribution areas 22, active areas 16, and collection areas 24. Thereafter, the remaining, non-reacted anode gas 50 is discharged from fuel cell 10 through outlet-side passages 30 and typically recirculated. On its path through fuel cell 10, anode gas 50 flows from an anode inlet side 54 to an anode outlet side 56.

On cathode sides 12 of membrane systems 13 and polar plates 14, a cathode gas 52 flows through inlet-side passages 30 into distribution areas 22. In each membrane system 13, cathode gas 52 consecutively flows through distribution areas 22, active areas 16, and collection areas 24. Thereafter, the remaining, non-reacted cathode gas 52 and reaction products formed in active area 16 are discharged from fuel cell 10 through outlet-side passages 30. Cathode gas 50 flows from a cathode inlet side 58 to a cathode outlet side 60.

As is schematically apparent from FIGS. 1 and 2, anode gas 52 (e.g., hydrogen) and cathode gas 54 (e.g., air) flow through anode sides 11 and cathode sides 12 in a counter flow. On the path through fuel cell 10, gases 52, 54 experience a pressure loss. This means that higher pressures are present at the particular inlets, i.e., in the particular distribution areas 22, of the reactants than at the particular outlets, i.e., in collection areas 24, of the reactants.

These pressure differences between the particular anode inlet and the particular cathode outlet, and between the particular cathode inlet and the particular anode outlet, combined with increased temperatures, may result in creeping of barrier layer 34 in fuel cells according to the prior art. This would result in a permanent deformation in the direction of the lower pressure.

Due to the one-sided supports of membrane systems 13 according to the present invention, i.e., in particular barrier layers 34 (the edge reinforcements), the forces resulting from the pressure difference are supported via supports 18, in the example via the extended gas diffusion layers 36 and the collection structures of polar plates 14. Since supports 18 are designed as extensions of gas diffusion layers 36, the production of membrane systems 13, to the extent these are produced as membrane system modules 42, are influenced only insignificantly. In this way, e.g., no further component is required. The height of the collection structures is reduced in this case only by one layer of a gas diffusion layer 36. The reduction of the height by gas diffusion layers 36 may furthermore be divided among channel depths of the anode and cathode collection structures and anode and cathode distribution structures.

LIST OF REFERENCE NUMERALS 10 fuel cell
11 anode side
12 cathode side
13 membrane system
14 polar plate
16 active area
18 support
20 flow area
22 distribution area
24 collection area
25 flow area pair
26 first flow area pair
28 second flow area pair
30 passages
32 membrane
34 barrier layer
35 operating media opening
36 gas diffusion layer
38 elevation
40 channel
42 membrane system module
44 bipolar plate module
50 anode gas
52 cathode gas
54 anode inlet side
56 anode outlet side
58 cathode inlet side
60 cathode outlet side
100 motor vehicle

The invention claimed is:

1. A fuel cell comprising:
at least two polar plates;
at least one membrane system situated between the at least two polar plates;
at least one flow area pair outside an active area of the membrane system, the at least one flow area pair including anode and cathode overlapping flow areas situated on either side of the membrane system;
a support designed to support the membrane system and situated in one of the overlapping flow areas, on one of the sides of the membrane system, between the membrane system and one of the polar plates.

2. The fuel cell as recited in claim 1 wherein at least one of the overlapping flow areas of the flow area pair is a collection area for collecting a reactant or a reaction product discharged from the active area, and the support is situated in the collection area.

3. The fuel cell as recited in claim 2 wherein the flow area of the flow area pair overlapping with the collection area is a distribution area for distributing a reactant to the active area.

4. The fuel cell as recited in claim 3 wherein the at least one flow area pair includes a first flow area pair and a second flow area pair, the distribution area of the first flow area pair and the collection area of the second flow area pair being situated on a same side of the membrane system.

5. The fuel cell as recited in claim 1 wherein at least one of the overlapping flow areas of the flow area pair includes at least one passage of the one polar plate fluidically connected to the active area, and the support is situated on the side of the membrane system facing away from the at least one passage.

6. The fuel cell as recited in claim 1 wherein the support covers at least two elevations of the one polar plate.

7. The fuel cell as recited in claim 1 wherein the support includes a material of a gas diffusion layer of the fuel cell.

8. The fuel cell as recited in claim 7 wherein the support and a gas diffusion layer of the fuel cell are designed in one piece.

9. The fuel cell as recited in claim 1 wherein the membrane system includes at least one barrier layer at least in the area of the overlapping flow areas.

10. The fuel cell as recited in claim 1 wherein the one polar plate includes channels, a base of the channels dropping at the transition from the active area into the flow area including the support.

11. A fuel cell comprising:
    at least two polar plates;
    at least one membrane system situated between the at least two polar plates;
    at least one flow area pair outside an active area of the membrane system, the at least one flow area pair including overlapping flow areas situated on either side of the membrane system;
    a support designed to support the membrane system and situated in one of the overlapping flow areas, on one of the sides of the membrane system, between the membrane system and one of the polar plates;
    wherein at least one of the overlapping flow areas of the flow area pair is a collection area for collecting a reactant or a reaction product discharged from the active area, and the support is situated in the collection area; wherein the flow area of the flow area pair overlapping with the collection area is a distribution area for distributing a reactant to the active area.

12. The fuel cell as recited in claim 11 wherein the at least one flow area pair includes a first flow area pair and a second flow area pair, the distribution area of the first flow area pair and the collection area of the second flow area pair being situated on a same side of the membrane system.

13. The fuel cell as recited in claim 11 wherein at least one of the overlapping flow areas of the flow area pair includes at least one passage of the one polar plate fluidically connected to the active area, and the support is situated on the side of the membrane system facing away from the at least one passage.

14. The fuel cell as recited in claim 11 wherein the support covers at least two elevations of the one polar plate.

15. The fuel cell as recited in claim 11 wherein the support includes a material of a gas diffusion layer of the fuel cell.

16. The fuel cell as recited in claim 15 wherein the support and a gas diffusion layer of the fuel cell are designed in one piece.

17. The fuel cell as recited in claim 11 wherein the membrane system includes at least one barrier layer at least in the area of the overlapping flow areas.

18. The fuel cell as recited in claim 11 wherein the one polar plate includes channels, a base of the channels dropping at the transition from the active area into the flow area including the support.

* * * * *